US005920420A

United States Patent [19]

Ishikura et al.

[11] Patent Number: 5,920,420

[45] Date of Patent: Jul. 6, 1999

[54] FARADAY ROTATOR WITH ANTIREFLECTION FILM

[75] Inventors: Kenji Ishikura; Kiyonari Hiramatsu; Kazushi Shirai; Norio Takeda, all of Tokyo, Japan

[73] Assignee: Mitsubishi Gas Chemical Company, Inc., Tokyo, Japan

[21] Appl. No.: 08/899,052

[22] Filed: Jul. 23, 1997

[30] Foreign Application Priority Data

Aug. 5, 1996 [JP] Japan .................................... 8-205996

[51] Int. Cl.[6] .............................. G02B 5/30; G02B 1/11; G02B 1/08

[52] U.S. Cl. .......................... 359/282; 359/283; 359/324; 359/586

[58] Field of Search .................................... 359/280, 282, 359/281, 283, 284, 577, 586, 589, 324, 484

[56] References Cited

U.S. PATENT DOCUMENTS

| | | | |
|---|---|---|---|
| 4,637,953 | 1/1987 | Sawamura et al. | 428/333 |
| 5,245,471 | 9/1993 | Iwatsuka et al. | 359/494 |
| 5,661,596 | 8/1997 | Biro et al. | 359/359 |
| 5,764,416 | 6/1998 | Rahn | 359/586 |

*Primary Examiner*—Georgia Epps
*Assistant Examiner*—Margaret Burke
*Attorney, Agent, or Firm*—Sughrue, Mion, Zinn, Macpeak & Seas, PLLC

[57] ABSTRACT

A Faraday rotator is formed of a bismuth-substituted iron garnet single crystal film on which an antireflection film is formed. The antireflection film includes first, second, and third layers. The first layer is a layer of silicon dioxide. The second layer is a layer of tantalum pentoxide. The third layer is a layer of silicon dioxide. The first, second, and third layers are formed in this order from the atmosphere side on the bismuth-substituted iron garnet single crystal film. The antireflection film may be formed on both of opposing surfaces of the single crystal film.

5 Claims, No Drawings

FARADAY ROTATOR WITH ANTIREFLECTION FILM

BACKGROUND OF THE INVENTION

1. Field of the Invention

The present invention relates to a highly reliable antireflection film formed on a bismuth-substituted iron garnet single crystal which is used as a Faraday rotator applied to magneto-optic sensors and optical isolators.

2. Description of Related Art

In recent years, optical fiber communications and optical instrumentation have made remarkable progress. Semiconductor lasers are widely used as a signal source in the optical fiber communications and optical instrumentation. However, semiconductor lasers are disadvantageous in that the oscillation becomes unstable due to so-called reflected light return where the light is reflected by, for example, the end surface of the optical fiber back to the semiconductor laser. In order to solve this drawback, an optical isolator is usually provided on the light-exiting side of the semiconductor laser. The optical isolator blocks the reflected light return, thereby stabilizing oscillation. The respective components that constitute the optical isolator are provided with antireflection films in order to prevent reflection for least optical loss.

An optical isolator includes a polarizer, analyzer, Faraday rotator, and permanent magnet. The permanent magnet causes the Faraday rotator to magnetically saturate. The Faraday rotator plays a major role in the optical isolator and is usually formed of a bismuth-substituted rare-earth iron garnet single crystal film having a thickness in the range from several tens to 400 $\mu$m, grown by the liquid phase epitaxial method (referred to as LPE method hereinafter). Such single crystals include $(HoTbBi)_3Fe_5O_{12}$ and $(LuTbBi)_3(FeAl)_5O_{12}$.

Conventionally, an antireflection film is formed by combining a plurality of materials having different refractive indices according to the refractive index of the material to which the antireflection film is applied, thereby providing as low a reflective index as possible. Of course, in some cases, a single material having a certain refractive index may sufficiently function as an antireflection film.

It is preferable that an antireflection film designed by combining materials having different refractive indices provides as low a reflection index as possible not only at the intended wavelength (referred to as central wavelength hereinafter) but also over a relatively wide range of wavelengths centered about the central wavelength.

A wide range of low reflective index is important since minute variations in manufacturing conditions of antireflection film may well cause the central wavelength of the antireflection film to deviate by several tens of nanometers from what it is designed to be.

The reflective index of a bismuth-substituted iron garnet single crystal film ranges from 2.3 to 2.4 in a near infrared region of 0.8 to 1.6 $\mu$m. Antireflection films used for this range of reflective index include a three-layer antireflection film comprising layers of $SiO_2$, $Al_2O_3$, and $SiO_2$, formed on the single crystal film in this order from the atmosphere side, and a two-layer antireflection film comprising layers of $SiO_2$ and $Ta_2O_5$, formed on the single crystal film in this order from the atmosphere side. These antireflection films provide low reflective indices not only at the central wavelength but also over a wide range of wavelengths centered about the central wavelength.

High reliability of components is of primary importance in optical communications. Recently, optical communications has placed greater demands on the component reliability. For example, requirement of humidity resistance was conventionally 85° C, 85% RH (Relative Humidity), and 1,000 hours but now 85° C, 85% RH (Relative Humidity), and 5,000 hours. This severe requirement is very difficult to meet. Conventional antireflection films are not sufficient to fulfill the requirement and there is a need for the development of an improved antireflection film.

SUMMARY OF THE INVENTION

An object of the invention is to provide an antireflection film suitable for a faraday rotator which fulfill requirement of 85° C., 85%, 5,000 hours.

A Faraday rotator is formed of a bismuth-substituted iron garnet single crystal film on which an antireflection film is formed. The antireflection film includes first, second, and third layers. The first layer is a layer of silicon dioxide ($SiO_2$). The second layer is a layer of tantalum pentoxide ($Ta_2O_5$). The third layer is a layer of silicon dioxide ($SiO_2$). The first, second, and third layers are formed in this order from the atmosphere side on the bismuth-substituted iron garnet single crystal film.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

In order to solve the aforementioned subject, the inventors of the present invention developed an antireflection film for use in a bismuth-substituted iron garnet signal crystal film that fulfills the requirement of humidity test at 85° C., 85%, and 5,000 hours.

The present invention is directed to a Faraday rotator comprising a bismuth-substituted iron garnet single crystal film, on which are formed, in order from the atmosphere side, layers of silicon dioxide ($SiO_2$), tantalum pentoxide ($Ta_2O_5$), and silicon dioxide ($SiO_2$) as an antireflection film.

A sample was prepared which is a bismuth-substituted iron garnet single crystal film coated with a three-layer antireflection film of $SiO_2$, $Al_2O_3$, and $SiO_2$ (referred to $SiO_2/Al_2O_3/SiO_2$ film hereinafter). Another sample was prepared which is a two-layer antireflection film of $SiO_2$ and $Ta_2O_5$ (referred to $SiO_2/Ta_2O_5$ film hereinafter) aligned in this order from the atmosphere side. The two samples were subjected to a humidity test of 85° C. and 85% RH.

The $SiO_2/Al_2O_3/SiO_2$ film began to show numerous small pinholes after 1,500 hours.

A tape test showed that the $SiO_2/Ta_2O_5$ film failed after 500 hours. Tape test is a test where a piece of plastic tape such as SCOTCH TAPE (Trade name) is stuck to the antireflection film under test and subsequently the piece of plastic tape is peeled off to determine an adhesion of the antireflection film to the material to which the antireflection film is applied. The tape test showed a decreased adhesion of the $SiO_2/Ta_2O_5$ film.

The inventors investigated combinations of various antireflection materials in order to develop an antireflection film which will not lose its adhesion and will not result in pinholes when a humidity test of 85° C. and 85% is conducted for a long period, specifically longer than 5,000 hours.

The inventors finally arrived at an antireflection film comprising layers of silicon dioxide, tantalum pentoxide, and silicon dioxide, which are formed on a bismuth-substituted iron garnet single crystal film in this order from the atmosphere side. The reflective index of the developed antireflection film was somewhat large compared to that of a conventional antireflection film used for a bismuth-substituted iron garnet single crystal film. However, after 5,000 hours of humidity test of 85° C. and 85% RH, no pinholes were observed in the antireflection film and adhesion of the antireflection film was not decreased.

When applying the present invention to a bismuth-substituted iron garnet single crystal film, the antireflection film may be formed preferably by the ion assisted deposition, ion plating, or sputtering. Vapor deposition is not suitable for the present invention since vacuum deposition does not provide high enough mechanical strength of antireflection film.

There is no particular requirements on the compositions of a Faraday rotator or bismuth-substituted iron garnet, but the bismuth-substituted iron garnet is preferably given by a general formula: $R_{3-x}Bi_xFe_{5-z}A_zO_{12}$ where R is at least one element selected from a group of Y, La, Ce, Pr, Nd, Sm, Eu, Gd, Tb, Dy, Ho, Er, Tm, Yb, and Lu, A is at least one element selected from a group of Ga, Sc, Al, and In, and x has the range $0.3 \leqq X < 2.0$ and $0 \leqq Z \leqq 1.0$.

While a bismuth-substituted iron garnet single crystal may be manufactured by any conventional method, the LPE method is preferable since the crystal can be handled without difficulty during manufacture, and the LPE method lends itself to mass production.

The present invention will be described in detail by way of examples and comparisons.

EXAMPLE 1

The following materials were introduced in a platinum crucible of 2,000 ml capacity: 5,000 gm lead oxide (PbO, 4N), 5,800 gm bismuth oxide ($Bi_2O_3$, 4N), 240 gm boron oxide ($B_2O_3$, 5N ), 30 gm terbium oxide ($Tb_4O_7$), and 48 gm holmium ($Ho_2O_3$, 3N). The crucible was placed in the center of the electric furnace for liquid phase epitaxy and was heated to 1,000° C. The heated material was blended well to prepare a homogeneous melt for growing a bismuth-substituted rare-earth iron garnet single crystal.

Using the thus prepared melt, a $(HoTbBi)_3Fe_5O_{12}$ single crystal film (referred to as G-film-1 hereinafter) having a thickness of 410 $\mu$m was formed by the usual method on one side of a 3-inch (111) garnet single crystal $[(GdCa)_3(GaMgZr)_5O_{12}]$ which has a lattice constant of 1.2497±0.0002 nm and a thickness of 500 $\mu$m.

G-film-1 was cut into a predetermined size of 10.5 mm square, yielding 28 sheets of films of 10.5-mm square. Of 28 sheets, nine sheets was selected and the substrates were removed from the sheets by polishing. The nine sheets were further adjusted to a thickness of 355 $\mu$m (referred to as 1.55-$\mu$m-G-film-1) so that a Faraday rotation of substantially 45 degrees can be achieved at a wavelength of 1.55 $\mu$m.

Three arbitrary sheets of nine sheets of 1.55-$\mu$m-G-film-1 were selected and a three-layer antireflection film was formed on both of opposing surfaces of 1.55-$\mu$m-G-film-1; a first layer of $SiO_2$ is a 148 nm thick optical thin film, a second layer of $Ta_2O_5$ is a 85 nm thick optical thin film, and a third layer of $SiO_2$ is a 143 nm thick optical thin film, formed in this order from the 1.55-$\mu$m-G-film-1 side.

The resultant reflective index on one surface of 1.55-$\mu$m-G-film-1 was 0.22% at a wavelength of 1,550 nm and less than 0.5% over a wavelength range from 1,530 nm to 1,570 nm.

Then, the three sheets of 1.55-$\mu$m-G-film-1 were cut into 75 chips of 2-mm square. Of the 75 chips, arbitrary 12 chips were placed as test samples in a humidity test instrument and a long-term humidity test was conducted at 85° C. and 85% RH. Prior to the humidity test, the tape test was conducted but the coating of antireflection film was not peeled off. During the long-term humidity test, the samples were taken out from the test instrument every 500 hours, and the samples were subjected to observation of the surface conditions, measurement of reflective index, and tape test. The samples showed no abnormal conditions of the surface thereof, decreases in reflective index, and peel-off of the coating of the antireflection film.

EXAMPLE 2

Three sheets of G-film-1 manufactured in EXAMPLE 1 were adjusted to a thickness of 254 $\mu$m (referred to as 1.31-$\mu$m-G-film-1 hereinafter) so that the Faraday rotation is substantially 45 degrees at a wavelength of 1.31 $\mu$m. Then, an antireflection film was formed on both of two opposing surfaces of 1.31-$\mu$m-G-film-1 by the ion assisted deposition, the antireflection film being formed of a first layer of $SiO_2$ of an about 125-nm thick optical thin film, a second layer of $Ta_2O_5$ of an about 72-nm thick optical thin film, and a third layer of $SiO_2$ of an about 120-nm thick optical thin film, formed in this order from the atmosphere side.

The resultant reflective index on one surface of 1.31-$\mu$m-G-film-1 was 0.19% at a wavelength of 1,310 nm and less than 0.5% over a wavelength range from 1,310 to 1,330 nm.

Then, the three sheets of 1.31-$\mu$m-G-film-1 were cut into 75 chips of 2 mm square. Of 75 chips, arbitrary 12 chips were placed as test samples in a humidity test instrument for a long-term humidity test at 85° C. and 85% RH. A tape test conducted prior to the humidity test showed that no coating of antireflection film was peeled off.

During the long-term humidity test, the samples were taken out from the test instrument every 500 hours, and the samples were inspected for any deteriorated surface conditions, measured to determine reflective index, subjected to a tape test.

After 5,000 hours, the samples showed no abnormal conditions of the surface thereof, decreases in reflective index, and peel-off of the coating of the antireflection film.

COMPARISON 1

Three sheets of 1.55-$\mu$m-G-film-1 obtained in EXAMPLE 1 were selected and a three-layer antireflection film was formed on both of opposing surfaces of 1.55-$\mu$m-G-film-1 by the ion assisted deposition; a first layer of $SiO_2$ in the form of an about 150 nm thick optical thin film, a second layer of $Al_2O_3$ in the form of an about 86 nm thick optical thin film, and a third layer of $SiO_2$ in the form of an about 150 nm thick optical thin film, in this order from the 1.55-$\mu$m-G-film-1 side.

The resultant reflective index on one side 1.55-$\mu$m-G-film-1 was 0.10% at a wavelength of 1.55 $\mu$m, and less than 0.3% over a wavelength range from 1,450 to 1,600 nm.

Then, the three sheets of 1.55-$\mu$m-G-film-1 were cut into 75 chips of 2-mm square. Of the 75 chips, arbitrary 12 chips were placed as test samples in a humidity test instrument and a long-term humidity test was conducted at 85° C. and 85% RH. Prior to the humidity test, a tape test was conducted but no coating of antireflection film was peeled off. During the long-term humidity test, the samples were taken out from the test instrument every 500 hours, and the samples were subjected to observation of the surface conditions, measurement of reflective index, and tape test.

Numerous pinholes appeared on the surface of all of the 12 samples after 1,500 hours and discoloring was observed in areas of about 5–10 $\mu$m diameter centered at the pinholes, i.e., poor appearance. When the test hour reached 5,000 hours, the pinholes had grown larger to sizes of about 5 to 10 $\mu$m in diameter but no peel-off of the antireflection film was observed during the tape test.

COMPARISON 2

Three 1.55-$\mu$m-G-film-1 obtained in EXAMPLE 1 were selected and a two-layer antireflection film was formed on the both of opposing surfaces of 1.55-$\mu$m-G-film-1 by the ion assisted deposition; a first layer of $Ta_2O_5$ is an about 217 nm thick optical thin film and a second layer of $SiO_2$ is an about 303 nm thick optical thin film, formed in this order from 1.55-$\mu$m-G-film-1 side.

The resultant reflective index on one surface of 1.55-$\mu$m-G-film-1 was 0.06% at a wavelength of 1,550 nm and less than 0.2% over a wavelength range from 1,420 to 1,630 nm.

Then, the three sheets of 1.55-$\mu$m-G-film-1 were cut into 75 chips of 2-mm square. Of the 75 chips, arbitrary 12 chips were placed as test samples in a humidity test instrument and a long-term humidity test was conducted at 85° C. and 85% RH. Prior to the humidity test, a tape test was conducted but no coating of antireflection film was not peeled off. During the long-term humidity test, the samples were taken out from the test instrument every 500 hours, and the samples were subjected to observation of the surface conditions, measurement of reflective index, and tape test.

Peel-off of the antireflection film was observed in eight out of 12 samples when a tape test was conducted after 500-hour humidity test. Peel-off occurred between the layer of $Ta_2O_5$ and the bismuth-substituted iron garnet single crystal film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A Faraday rotator having a bismuth-substituted iron garnet single crystal film coated with an antireflection film, the antireflection film comprising:

a first layer of silicon dioxide ($SiO_2$);

a second layer of tantalum pentoxide ($Ta_2O_5$); and a third layer of silicon dioxide ($SiO_2$);

wherein said first, second, and third layers being formed in this order from the atmosphere side; and wherein said third layer is directly adjacent to said bismuth-substituted iron garnet single crystal film.

2. The Faraday rotator according to claim 1, wherein the bismuth-substituted iron garnet single crystal film is given by a general formula: $R_{3-x}Bi_xFe_{5-z}A_zO_{12}$ where R is at least one element selected from a group of Y, La, Ce, Pr, Nd, Sm, Eu, Gd, Tb, Dy, Ho, Er, Tm, Yb, and Lu, and A is at least one element selected from a group of Ga, Sc, Al, and In, and $0.3 \leqq X < 2.0$ and $0 \leqq Z \leqq 1.0$.

3. The Faraday rotator according to claim 1, wherein the said first, second, and third layers are formed on two opposing surfaces of the bismuth-substituted iron garnet single crystal film.

4. A Faraday rotor according to claim 1, wherein the antireflection film consists essentially of the first layer, the second layer, and the third layer.

5. A Faraday rotor according to claim 1, wherein the antireflection film consists of the first layer, the second layer, and the third layer.

* * * * *